(12) United States Patent
Haratake

(10) Patent No.: US 7,788,777 B2
(45) Date of Patent: Sep. 7, 2010

(54) DEVICE FOR INSTALLING PISTON RING

(75) Inventor: Kenichi Haratake, Tokyo (JP)

(73) Assignee: Hirata Corporation, Tokyo (JP)

( * ) Notice: Subject to any disclaimer, the term of this patent is extended or adjusted under 35 U.S.C. 154(b) by 1306 days.

(21) Appl. No.: 10/559,807

(22) PCT Filed: Jun. 26, 2003

(86) PCT No.: PCT/JP03/08088

§ 371 (c)(1), (2), (4) Date: Dec. 8, 2005

(87) PCT Pub. No.: WO2005/000520

PCT Pub. Date: Jan. 6, 2005

(65) Prior Publication Data

US 2006/0123610 A1    Jun. 15, 2006

(51) Int. Cl.
| | |
|---|---|
| B25B 27/14 | (2006.01) |
| B23P 15/10 | (2006.01) |
| B23P 21/00 | (2006.01) |
| B23P 19/04 | (2006.01) |
| B23P 11/02 | (2006.01) |

(52) U.S. Cl. .......................... 29/222; 29/281.1; 29/771; 29/269; 29/453

(58) Field of Classification Search ................ 29/281.1, 29/281.3, 235, 236, 251, 525, 426.4, 771, 29/222; B23Q 7/10; B23P 19/02, 15/10
See application file for complete search history.

(56) References Cited

U.S. PATENT DOCUMENTS 3,707,027 A * 12/1972 Davis et al. .................... 29/222
5,435,056 A * 7/1995 Liechty et al. ................. 29/771
5,737,831 A * 4/1998 Liechty et al. ................. 29/771

FOREIGN PATENT DOCUMENTS

| CA | 2 117 415 | 4/1995 |
| EP | 0 648 580 | 9/1994 |
| EP | 1 114 692 | 1/2001 |

(Continued)

*Primary Examiner*—Joseph J Hail, III
*Assistant Examiner*—Jamal Daniel
(74) *Attorney, Agent, or Firm*—Wenderoth, Lind & Ponack, L.L.P.

(57) ABSTRACT

A piston-ring-installing device including a base (110) having a through-hole (111); and a guide member (120) disposed in the through-hole and fixed to the base, for positioning a piston in the vertical direction while receiving a head of the piston that is suspended downwardly in the vertical direction, and guiding a piston ring while widening a diameter of the piston ring by an outer peripheral surface of the guide member. A piston pressing member (130) is disposed above the base and supported movably toward a concave part (121b) of the guide member. The piston pressing member has a tapered inner wall surface (131) that is widened downwardly so as to come into contact with an edge of an upper end of the piston. A driving mechanism (140) is disposed on the base, and the driving mechanism is operable to drive the piston pressing member at least in the vertical direction. Also provided is a ring feeding mechanism (150) that feeds the piston ring placed on the guide member upwardly. Hence, a piston-ring installing operation is swiftly performed, and productivity is improved.

5 Claims, 10 Drawing Sheets

FOREIGN PATENT DOCUMENTS

| | | |
|---|---|---|
| FR | 2 803 234 | 7/2001 |
| JP | 63-306843 | 12/1988 |
| JP | 8-090359 | 4/1996 |
| JP | 8-300232 | 11/1996 |
| JP | 9-11057 | 1/1997 |
| JP | 11-10459 | 1/1999 |
| JP | 11-179622 | 7/1999 |
| JP | 11-197958 | 7/1999 |

* cited by examiner

DEVICE FOR INSTALLING PISTON RING

TECHNICAL FIELD

This invention relates to a device and a method for installing a piston ring onto a piston of an internal combustion engine, and more particularly, to a device and a method for supplying and installing a piston ring from below onto a piston suspended and held downwardly in a vertical direction.

BACKGROUND ART

A piston reciprocating in a cylinder bore of an internal combustion engine has a plurality of ring grooves (for example, three ring grooves). For example, two compression rings (chiefly, a first ring that seals a combustion gas and a second ring that seals the combustion gas and adjusts a lubricant film) used to prevent a combustion gas from blowing through and an oil ring consisting of a plurality of components to adjust the lubricant film are fitted in these ring grooves. A connecting rod is swingably connected to the piston.

A known conventional device for installing these piston rings is made up of a cylindrical guide member whose diameter becomes greater upwardly from below and that has a concave part to receive a head of a piston at its upper end, a ring feeding mechanism that pushes up the piston rings stacked and held on the outer periphery of the guide member from below, and a robot that places the piston toward the concave part of the guide member (see Japanese Unexamined Patent Publication No. H8-90359, for example).

However, in the device disclosed by this publication, if the piston is disposed in the concave part in a slightly inclined state when the piston is transferred to and positioned in the concave part of the guide member by means of the robot, the piston rings guided by the outer circumferential surface of the guide member do not become parallel to the ring grooves of the piston, and hence there is a fear that a mistake will occur in installing the piston rings.

Therefore, disadvantageously, there is a need to perform positioning in a horizontal direction and positioning in a vertical direction with high accuracy when the piston is positioned in the concave part, and productivity is reduced if the control speed of the robot is decreased.

Another known conventional device for installing the piston rings is made up of a cylindrical guide member, a ring feeding mechanism that pushes up the piston rings stacked and held on the outer periphery of the guide member from below, an exterior inner-diameter restraining jig, and an interior inner-diameter restraining jig that is disposed coaxially with the exterior inner-diameter restraining jig and that has a concave part to receive a head of a piston at its upper end in order to guide the piston rings fed to the upper end of the guide member to the ring grooves while reducing their diameters through multiple stages (see Japanese Unexamined Patent Publication No. H11-179622, for example).

However, in the device disclosed by this publication, since positioning is performed by a manual operation or by a handling device, such as a robot, when the piston is positioned in the concave part, a positioning problem occurs as in the above conventional device. Additionally, disadvantageously, since the diameters of the piston rings are reduced through multiple stages, much time is consumed to reach the step of installing the piston rings, and productivity is reduced.

The present invention has been made in consideration of the circumstances of the conventional technique. It is therefore an object of the present invention to provide a piston-ring-installing device and method capable of improving the positioning accuracy of a piston, capable of improving productivity, and capable of reducing cost while increasing processing speed with a simple mechanical structure without employing, for example, a complex control sequence.

SUMMARY OF THE INVENTION

The piston-ring-installing device of the present invention that achieves the above object includes a base having a through-hole passing through the base in a vertical direction; a guide member disposed in the through-hole and fixed to the base, the guide member positioning a piston in the vertical direction while receiving a head of the piston suspended downwardly in the vertical direction, the guide member guiding a piston ring while widening a diameter of the piston ring by means of an outer peripheral surface of the guide member; a piston pressing member disposed above the base and supported movably toward a concave part of the guide member, the piston pressing member having a centering part that performs a centering action while depressing the piston suspended downwardly in the vertical direction; a driving mechanism disposed on the base, the driving mechanism driving the piston pressing member at least in the vertical direction; and a ring feeding mechanism that feeds the piston ring guided by the guide member upwardly.

According to this structure, the piston pressing member is driven downwardly by the driving mechanism, and the piston suspended downwardly in the vertical direction is depressed downwardly by the centering part of the piston pressing member. Accordingly, the piston is received by the concave part of the guide member while undergoing a centering (aligning) action, i.e., while being positioned in the horizontal direction, and is then positioned in the vertical direction. The piston ring guided by the guide member is fed upwardly by the ring feeding mechanism, is then separated from the upper end of the guide member, and is fitted around the piston (more specifically, the ring groove of the piston).

Since the driving mechanism, the piston pressing member, and the guide member are provided on the base, and since the piston pressing member performs a centering action as described above, the piston and the piston ring can be highly accurately positioned in the horizontal and vertical directions with a simple structure and with ease. Hence, productivity is improved, and production costs are reduced.

Preferably, in the device structured as above, the centering part may be a tapered inner wall surface widened downwardly so as to come into contact with an edge of an upper end of the suspended piston.

According to this structure, the piston pressing member is driven downwardly by the driving mechanism, and the piston is depressed downwardly while bringing the inner wall surface of the piston pressing member into contact with the edge of the upper end of the piston. Merely thereby, a centering (aligning) action, i.e., a positioning operation in the horizontal direction can be performed. The structure can be simplified by using the inner wall surface of the piston pressing member as the centering part.

Preferably, in the device structured as above, the driving mechanism may be formed so as to obliquely downwardly move the piston pressing member and then vertically downwardly move the piston pressing member when the piston pressing member is driven toward the concave part, and the piston pressing member may have a notch part formed so as not to come into contact with a connecting rod of the suspended piston.

According to this structure, the piston pressing member first approaches the piston, which holds the connecting rod and which is suspended downwardly in the vertical direction, obliquely downwardly from above so that the notch part thereof faces the connecting rod, and then moves vertically downwardly so as to depress the piston. Therefore, horizontal positioning can be performed with high accuracy while maintaining a horizontal state without inclining the piston.

Preferably, in the device structured as above, the driving mechanism may include a vertically movable member driven in the vertical direction, a horizontally movable member that holds the piston pressing member and that is supported movably horizontally with respect to the vertically movable member, and a cam member that exerts a cam action onto a follower provided on the horizontally movable member.

According to this structure, when the vertically movable member is driven downwardly, the follower of the horizontally movable member receives a cam action of the cam member, and the horizontally movable member holding the piston pressing member first moves obliquely downwardly and then moves vertically downwardly. Therefore, since only one driving source that drives the vertically movable member is employed as the driving source, the structure is simplified.

Preferably, in the device structured as above, the guide member may include a lower guide part formed as an outer peripheral surface with the same diameter over a predetermined length, and the lower guide part has an annular convex part that restricts a downward movement of the piston ring and that is formed at a halfway position in an axial direction thereof.

According to this structure, a plurality of stacked piston rings fed from below by means of the ring feeding mechanism are held by the outer peripheral surface of the guide member without being dropped off when the lowest piston ring goes beyond the annular convex part and are fed upwardly, even if the feeding action or the holding action of the ring feeding mechanism does not function. Therefore, when piston rings are supplied to the guide member by use of, for example, a plurality of magazines that hold the piston rings, the retreat of the ring feeding mechanism and the replacement of the magazine can be easily performed at a desired timing.

Preferably, in the device structured as above, the concave part of the guide member may be provided with at least three positioning blocks to come into contact with the head of the piston and to position the piston in the vertical direction.

According to this structure, since the concave part of the guide member is provided with the positioning blocks exclusively used for positioning in the vertical direction, the head of the piston can be supported, for example, at intervals of an equal angle, and the piston can be positioned in the vertical direction with higher accuracy while preventing inclination.

Preferably, in the device structured as above, a ring sensor that detects a piston ring immediately before the piston ring is disengaged from an upper end of the guide member may be disposed on the base.

According to this structure, the ring feeding mechanism can be controllably driven based on a detection signal of the ring sensor, and piston rings can be reliably fed one by one.

The piston-ring-installing method of the present invention that achieves the above object includes a depressing step of depressing a piston so as to locate the piston at a predetermined position while centering the piston suspended downwardly in a vertical direction, and a ring feeding step of vertically upwardly feeding a piston ring toward the piston located at the predetermined position according to the depressing step while widening a diameter of the piston ring, and, when the piston ring reaches the same height as a ring groove of the piston, releasing a state of widening the diameter of the piston ring.

According to this structure, the piston is held at a predetermined position while undergoing a centering (aligning) operation, i.e., a positioning operation in the horizontal direction, and is positioned in the vertical direction according to the depressing step, and a widened piston ring is fed, and is fitted around the piston (more specifically, the ring groove of the piston) according to the ring feeding step.

Thus, the piston and the piston ring can be easily and swiftly positioned in the horizontal and vertical directions with high accuracy through an easy depressing operation including the centering action. Hence, productivity is improved, and production costs are reduced.

Preferably, in the method structured as above, the depressing step may be performed such that a tapered inner wall surface widened downwardly is obliquely downwardly moved, and then is vertically downwardly moved so as to come into contact with an edge of an upper end of the suspended piston.

According to this structure, the inner wall surface disposed apart from the piston obliquely downwardly approaches the piston, which holds the connecting rod and which is suspended downwardly in the vertical direction, and comes into contact with the piston at the stage of having moved downwardly in the vertical direction. Hence, horizontal positioning can be highly accurately performed while keeping the piston in a horizontal state without inclining the piston.

DETAILED DESCRIPTION OF THE INVENTION

The best mode of the present invention will be hereinafter described with reference to the attached drawings.

Figure 1:
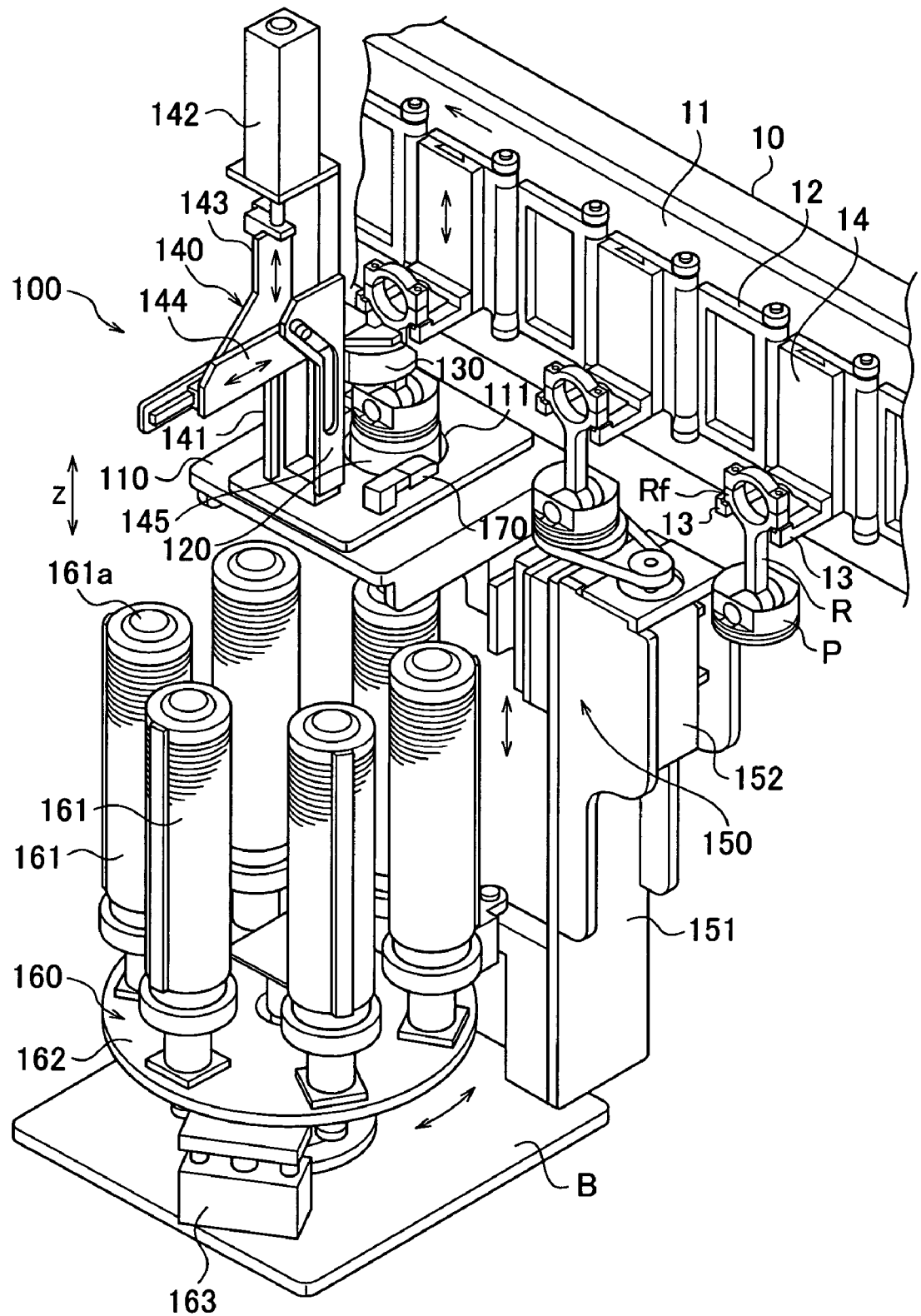
FIG. 1 is an external perspective view of a device for installing a piston ring according to the present invention.
Figure 2:
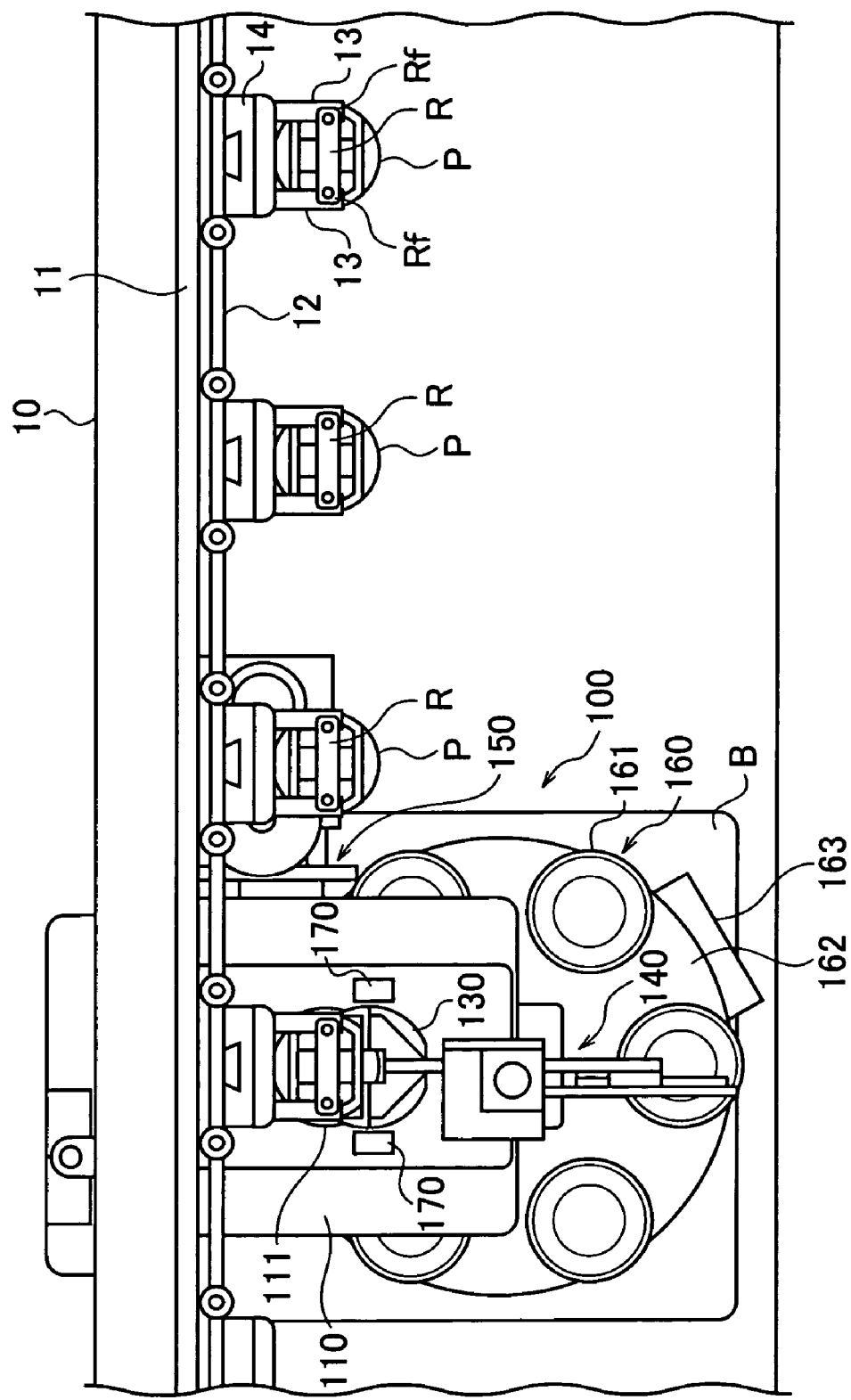
FIG. 2 is a plan view of the piston-ring-installing device according to the present invention.
Figure 3:
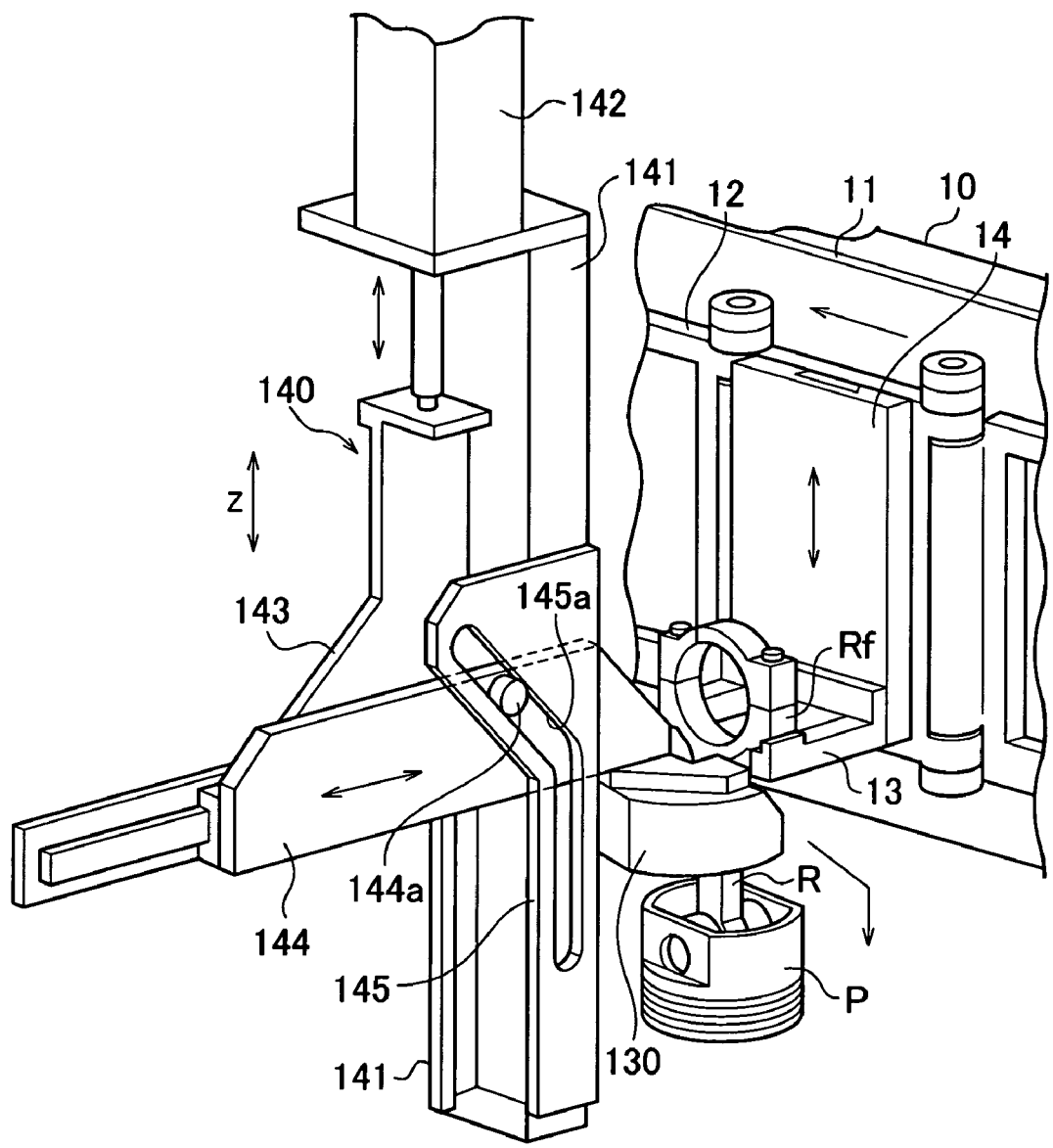
FIG. 3 is a partial perspective view showing a part of the device according to the present invention.

As shown in FIG. 1 to FIG. 3, a piston-ring-installing device includes a frame 10, a guide rail 11 that extends in a horizontal direction at the upper part of the frame 10, a conveyor 12 that is guided along the guide rail 11, and a piston-ring-installing unit 100 disposed under the conveyor 12.

The conveyor 12 is used to convey a piston P, to which a connecting rod R is connected, from a processing step performed on the upstream side in the flow of a sequence of operations to this installing step, and, after completing the installing step, continuously convey the piston P to a processing step performed on the downstream side. As shown in FIG. 1 to FIG. 3, the conveyor 12 has a plurality of pairs of holding arms 13 spaced with predetermined intervals, in order to position and hold flange parts Rf of the connecting rod R.

As shown in FIG. 1 to FIG. 3, the pair of holding arms 13 support the flange parts Rf of the connecting rod R from below outside the flange parts Rf, and hold the piston P in a state in which the piston P is suspended downwardly in the vertical direction (Z direction) (so as to direct a head of the piston P downwardly). The pair of holding arms 13 are fixed to a movable plate 14 supported reciprocatively in the vertical direction (Z direction) with respect to the conveyor 12. The movable plate 14 is upwardly urged by, for example, a spring, and is stopped at an upper movement end while holding the piston P.

As shown in FIG. 1 to FIG. 3, the piston-ring-installing unit 100 includes a base 110 provided with a through-hole 111 passing through the base 110 in the vertical direction, a guide member 120 that is (coaxially) positioned in the through-hole 111 and that is fixed to the base 110, a piston pressing member 130 that depresses the piston P, a driving mechanism 140 that is disposed on the base 110 and that drives the piston pressing member 130, a ring feeding mechanism 150 disposed under the base 110, a magazine mechanism 160 that supplies piston rings, and a ring sensor 170.

The base 110 is fixed to the frame 10, and serves as a reference element for a positional adjustment between the piston P and the piston ring PR when the piston P suspended from above the base 110 is guided and when the piston ring PR guided through the through-hole 111 from below the base 110 is fitted in a ring groove Pg of the piston P.

Figure 4:
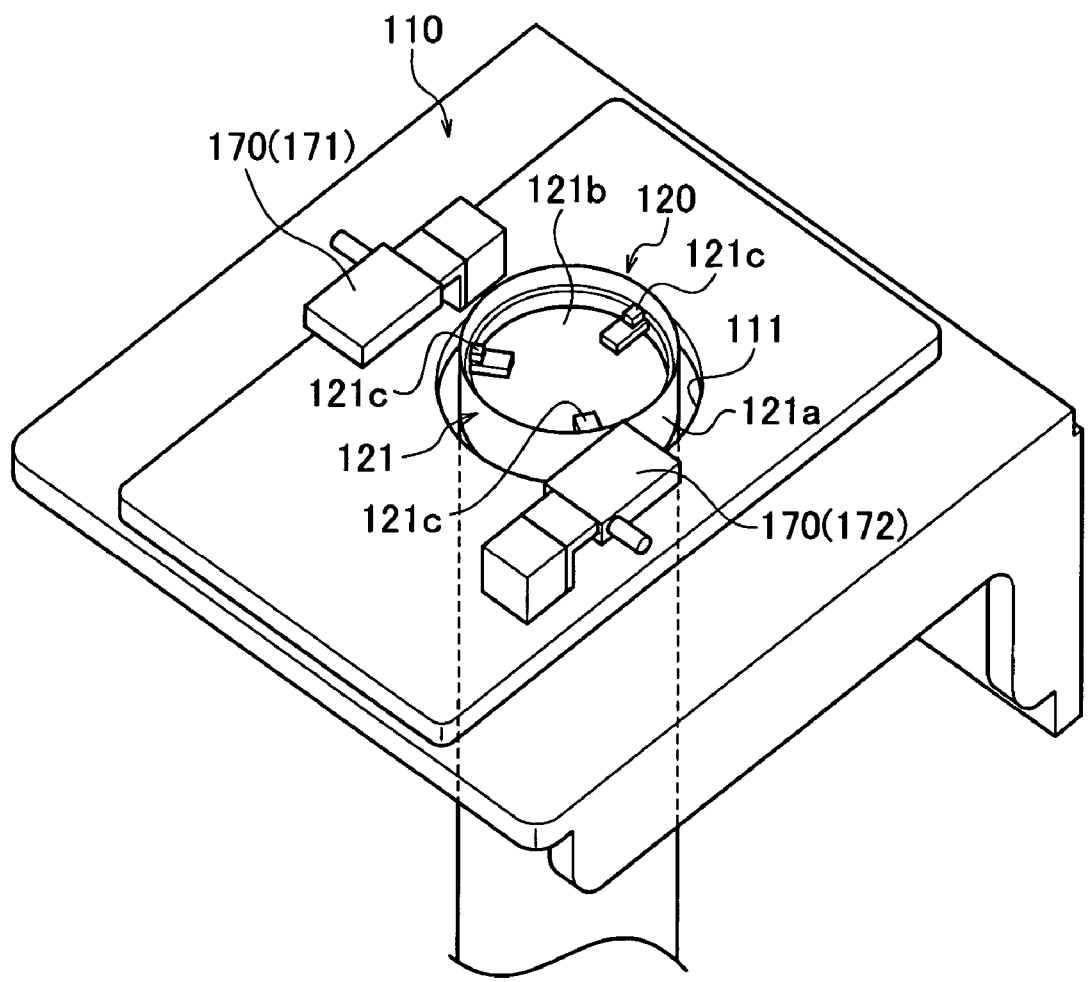
FIG. 4 is a partial perspective view showing a relationship between a base, a guide member, and a ring sensor, each serving as a part of the device according to the present invention.
Figure 5:
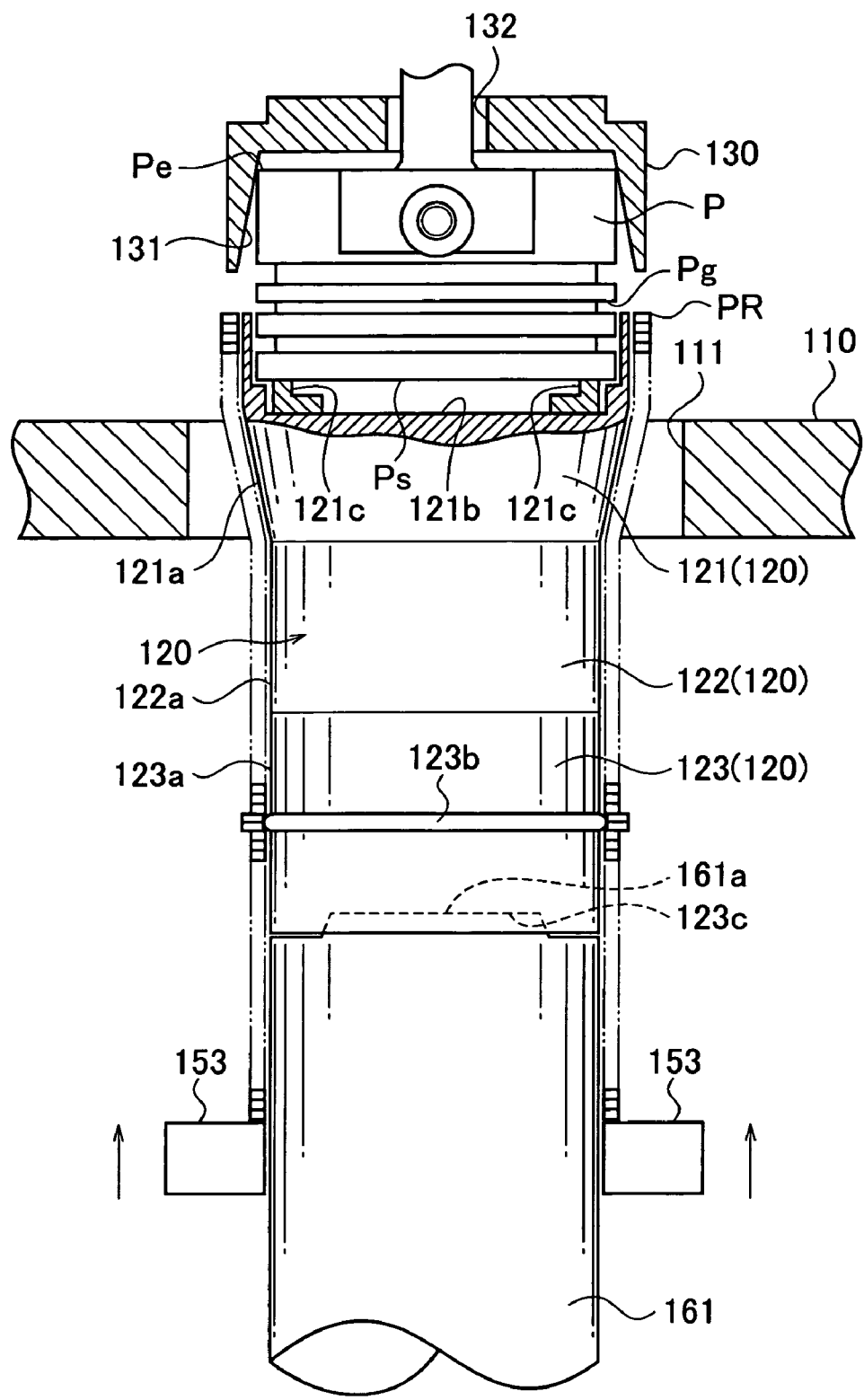
FIG. 5 is a side view showing a relationship between a piston positioned in a concave part of the guide member and a piston ring held on the outer circumferential surface of the guide member.
Figure 6:
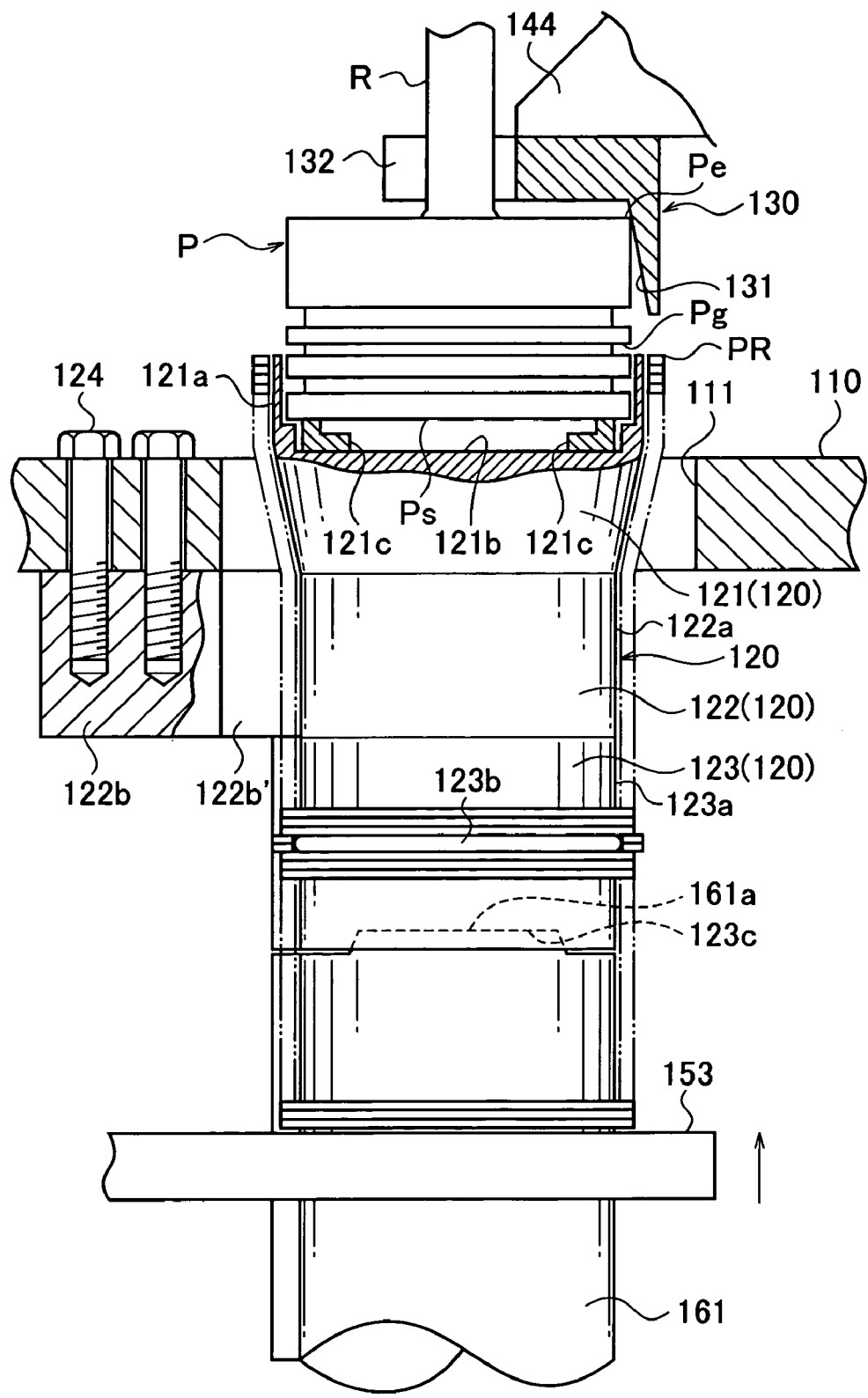
FIG. 6 is a side view showing a relationship between the piston positioned in the concave part of the guide member and the piston ring held on the outer circumferential surface of the guide member.
Figure 7:
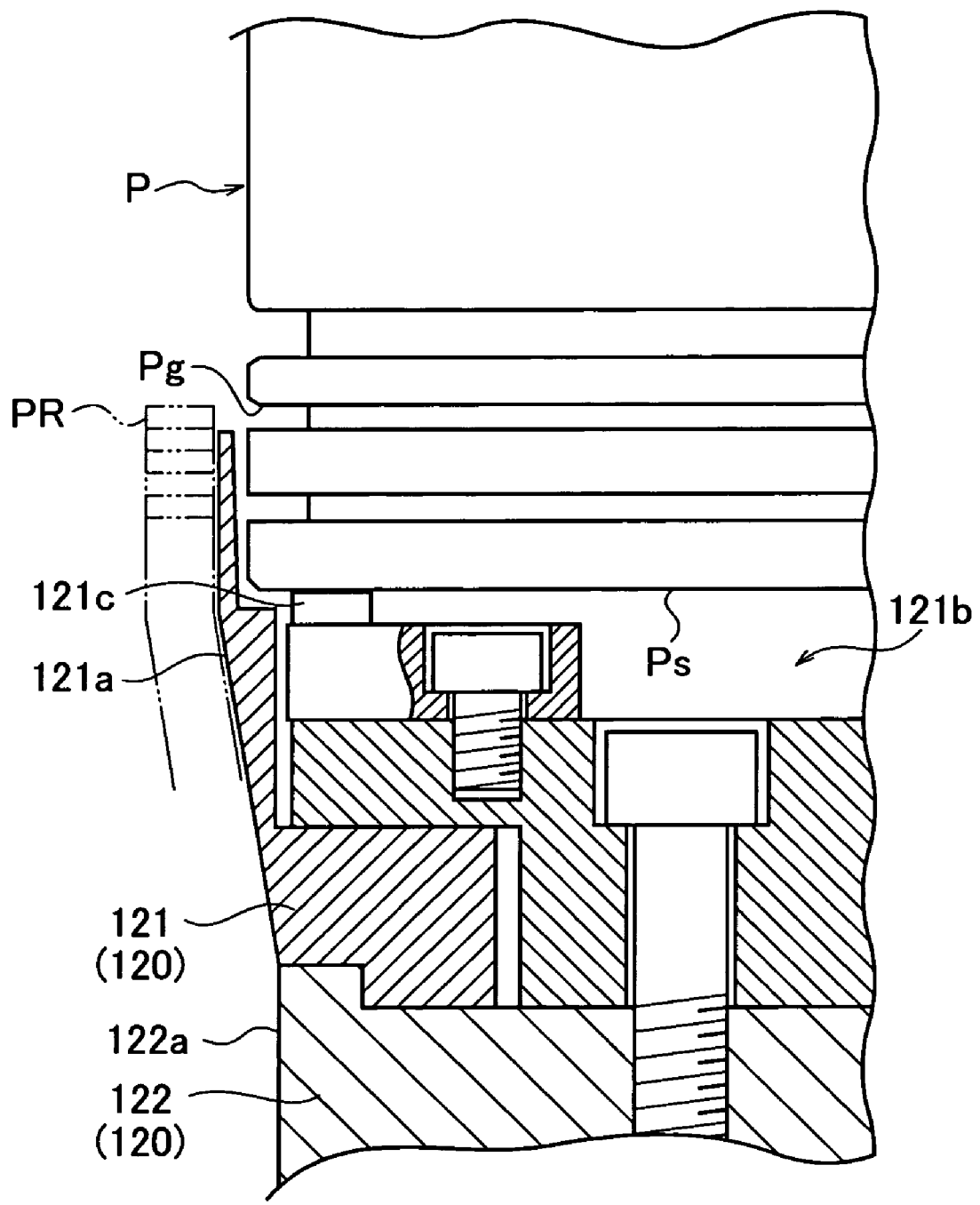
FIG. 7 is an enlarged sectional view showing a state in which the piston is positioned in the concave part of the guide member.

As shown in FIG. 4 to FIG. 6, the guide member 120 is disposed to extend in the vertical direction coaxially with the through-hole 111 in the through-hole 111 of the base 110, and is made up of an upper guide part 121 disposed near the through-hole 111, an intermediate guide part 122 connected to a lower end of the upper guide part 121, and a lower guide part 123 connected to a lower end of the intermediate guide part 122.

As shown in FIG. 4 to FIG. 7, the upper guide part 121 is made up of an outer peripheral surface 121a that has an area in which the diameter of the outer peripheral surface 121a is widened from the lower part toward the upper part thereof and that guides the piston ring PR while widening the diameter of the piston ring PR by a predetermined amount, a concave part 121b that is formed at the upper end thereof and that receives a head Ps of the piston P, and three positioning blocks 121c fixed to the bottom of the concave part 121b.

The diameter of the concave part 121b is slightly greater than the outer diameter of the piston P. The three positioning blocks 121c are disposed at intervals of 120 degrees with respect to the bottom of the concave part 121b, and are fastened by, for example, bolts.

As shown in FIG. 4 to FIG. 7, in the upper guide part 121, the piston P is depressed by the piston pressing member 130, and, when the head Ps enters the concave part 121b and comes into contact with the three positioning blocks 121c, the three positioning blocks 121c support the head Ps (end face) and horizontally hold the head Ps. Further, the three positioning blocks 121c position the piston P (the ring groove Pg) at a predetermined position in the vertical direction (Z direction).

As shown in FIG. 5 and FIG. 6, the intermediate guide part 122 is made up of an outer peripheral surface 121a and a connection part 122b. The outer peripheral surface 121a is formed over a predetermined length with the same diameter as the outer diameter of the lowest end of the outer peripheral surface 121a. The connection part 122b protrudes from a part of the outer peripheral surface 121a outwardly in the radial direction and has an area 122b' that has a smaller plate thickness than a gap between abutment joints of the piston ring PR, which is not a closed circle, and that extends in the vertical direction.

As shown in FIG. 6, the intermediate guide part 122 has the connection part 122b fixed to the base 110 by means of, for example, bolts 124, and holds the upper guide part 121 fixed by the upper end thereof and the lower guide part 123 fixed by the lower end thereof together.

As shown in FIG. 5 and FIG. 6, the lower guide part 123 is made up of an outer peripheral surface 123a formed over a predetermined length with the same diameter as the outer peripheral surface 121a, an annular convex part 123b that annularly protrudes outwardly in the radial direction in the middle area of the outer peripheral surface 123a, and a concave part 123c formed to receive an upper end part 161a of a magazine 161, which is described later, at the lower end thereof.

The annular convex part 123b acts to widen the diameter of the piston ring PR, and prevents the piston ring PR pushed above this from dropping off downwardly.

As described above, in the guide member 120 made up of the upper guide part 121, the intermediate guide part 122, and the lower guide part 123, the head Ps of the piston P suspended downwardly in the vertical direction is received by the concave part 121b, and is positioned at a predetermined position in the vertical direction by means of the three positioning blocks 121c. Further, the piston ring PR is guided upwardly in the outer peripheral surfaces 123a, 121a, and 121a, and is guided to the ring groove Pg of the piston P while widening the diameter thereof.

As shown in FIG. 1, FIG. 5, and FIG. 6, the piston pressing member 130 is disposed above the base 110, and is supported by a horizontally movable member 144 described later. The piston pressing member 130 is first moved obliquely downwardly toward the concave part 121b of the guide member 120, and is then moved downwardly in the vertical direction by means of the driving mechanism 140.

As shown in FIG. 5, FIG. 6, FIG. 8, FIG. 9A, FIG. 9B, and FIG. 9C, the piston pressing member 130 is shaped like a cylindrical cap opened downwardly a part of which has been cut off, and is made up of a tapered inner wall surface 131 widened downwardly and a substantially rectangular notch part 132 continuously formed on a side wall and an upper wall that have been cut.

Figure 8:
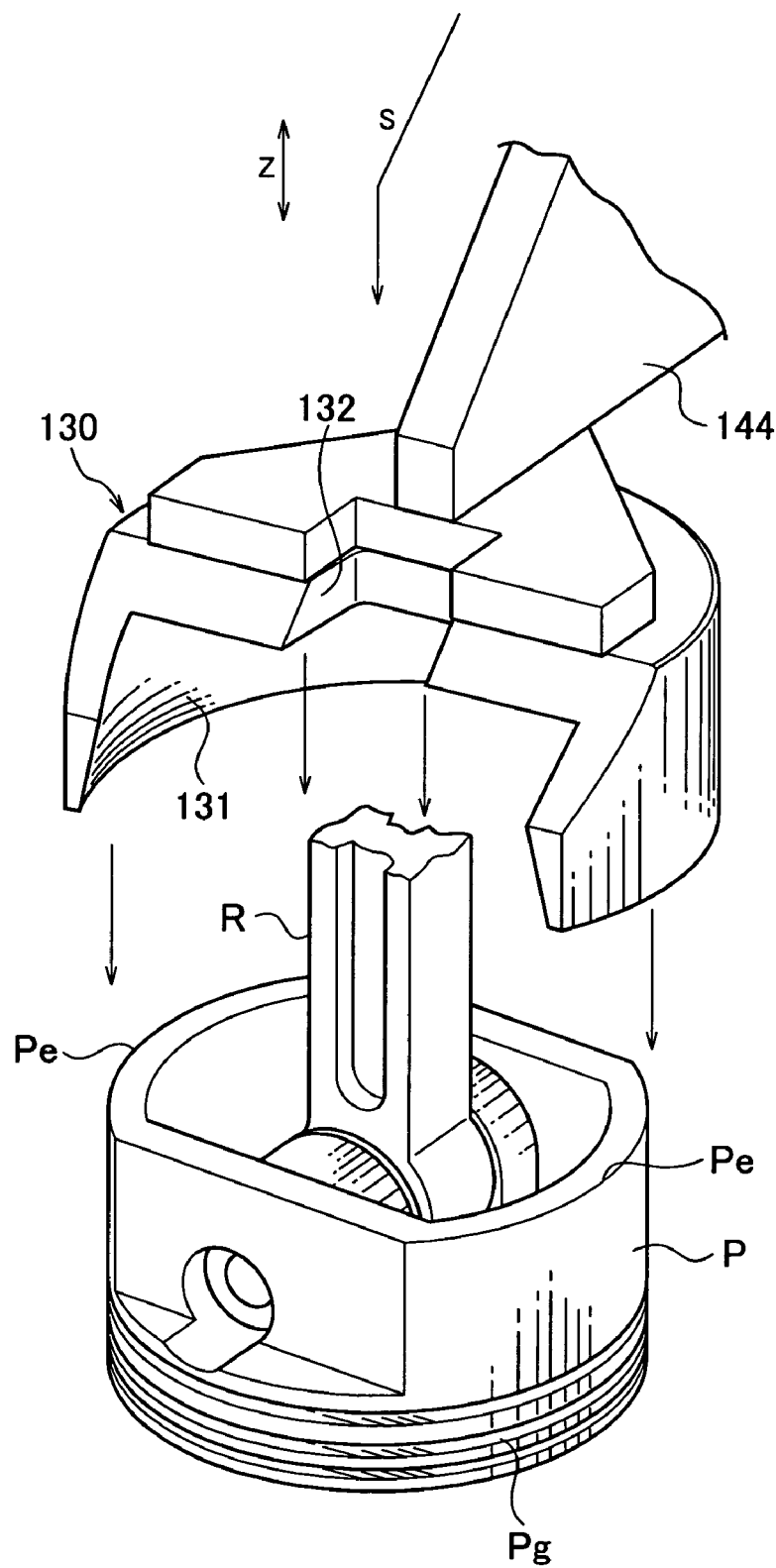
FIG. 8 is a partial perspective view showing a relationship between a piston pressing member serving as a part of the device according to the present invention, a piston, and a connecting rod.
Figure 9A:
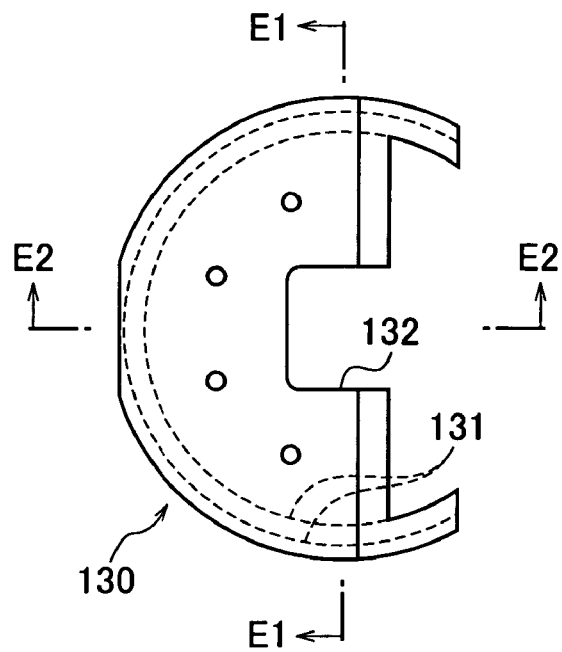
FIG. 9A is a plan view showing the piston pressing member.
Figure 9B:
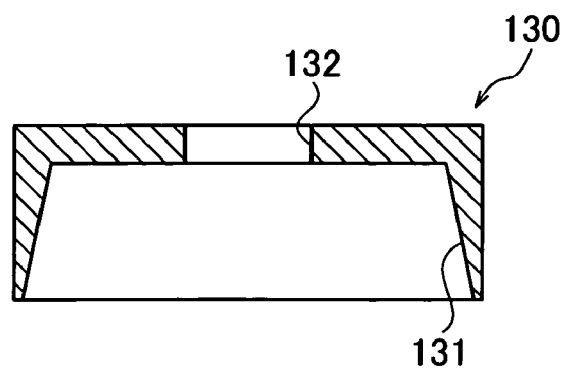
FIG. 9B is a sectional view along line E1-E1 of FIG. 9A.
Figure 9C:
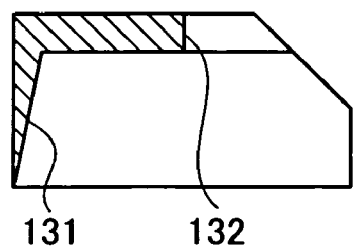
FIG. 9C is a sectional view along line E2-E2 of FIG. 9A.

As shown in FIG. 5, FIG. 6, and FIG. 8, the inner wall surface 131 comes in contact with an edge Pe of the upper end of the piston P suspended downwardly in the vertical direction to perform a centering (aligning) operation for the piston P in accordance with the downward movement thereof, thereby performing a horizontal positioning operation in such a manner that the axial center of the piston P coincides with the axial center of the concave part 121b of the guide member 120 (the upper guide part 121).

As shown in FIG. 5, FIG. 6, and FIG. 8, the notch part 132 is formed so as not to come into contact with the connecting rod R of the suspended piston P in the whole process in which it moves obliquely downwardly and then moves vertically downwardly.

In more detail, the piston pressing member 130 first approaches the piston P obliquely downwardly from above so that the notch part 132 can face the connecting rod R, and then moves downwardly in the vertical direction, so that the inner wall surface 131 comes into contact with the edge Pe and depresses the piston P. Accordingly, horizontal positioning can be performed with high accuracy according to its centering (aligning) action while maintaining a horizontal state without inclining the piston P.

As shown in FIG. 1, FIG. 3, and FIG. 8, the driving mechanism 140 is made up of a frame 141 that is fixed onto the base 110 and that extends in the vertical direction, an actuator 142 that is fixed to the upper end of the frame 141 and that serves as a driving source, a vertically movable member 143 that is reciprocatively driven by the actuator 142 in the vertical direction (Z direction), a horizontally movable member 144 that is supported horizontally reciprocatively with respect to the vertically movable member 143 and that holds the piston pressing member 130 at its end, and a cam member 145 that has a cam groove 145a and that is fixed to the frame 141 so as to exert a cam action onto a cylindrical follower 144a provided on the horizontally movable member 144.

As shown by arrow S in FIG. 8, the cam groove 145a of the cam member 145 guided the follower 144a so as to move the piston pressing member 130 obliquely downwardly to position the piston pressing member 130 substantially right above the piston P, and then so as to move it vertically downwardly to depress the piston P when the piston pressing member 130 is moved from a standby position located obliquely above the piston P to a depressing position located right above the base 110 (right above the concave part 121b of the guide member 120).

As described above, the piston P can be centered (positioned in the horizontal direction) while using the cam action exerted by the cam member 145 merely by using the single actuator 142 that serves as a driving source and that drives the movable member in the vertical direction. Therefore, a positioning operation can be performed more swiftly and reliably than a case in which positioning is performed by, for example, an articulated robot, because it is performed by a mechanical mechanism. Hence, the structure can be simplified, and productivity can be improved.

The ring feeding mechanism 150 is to feed the piston ring PR guided to the guide member 120 upwardly, and, as shown in FIG. 1, FIG. 5, and FIG. 6, is made up of a frame 151 fixed onto a base B, a motor 152 fixed to the frame 151, and a pair of push-up pieces 153 driven by the motor 152 so as to reciprocate in the vertical direction and approach or separate from the outer peripheral surface of the magazine 161.

When the pair of push-up pieces 153 are driven upwardly in the state of being close to the outer peripheral surface of the magazine 161, stacked piston rings PR are successively fed such that a piston ring PR placed at the uppermost end of the guide member 120 is fitted into the ring groove Pg by pushing up the lowest piston ring PR held by the magazine 161 or the lowest piston ring PR held by the guide member 120.

As shown in FIG. 1 and FIG. 2, the magazine mechanism 160 is made up of a plurality of cylindrical magazines 161 that hold piston rings PR in the state of being stacked up, an index plate 162 that supports the magazines 161 and that is supported rotatably with respect to the base B, and a driving mechanism 163 that drives the index plate 162 and that moves the magazines 161 up and down.

Figure 10A:
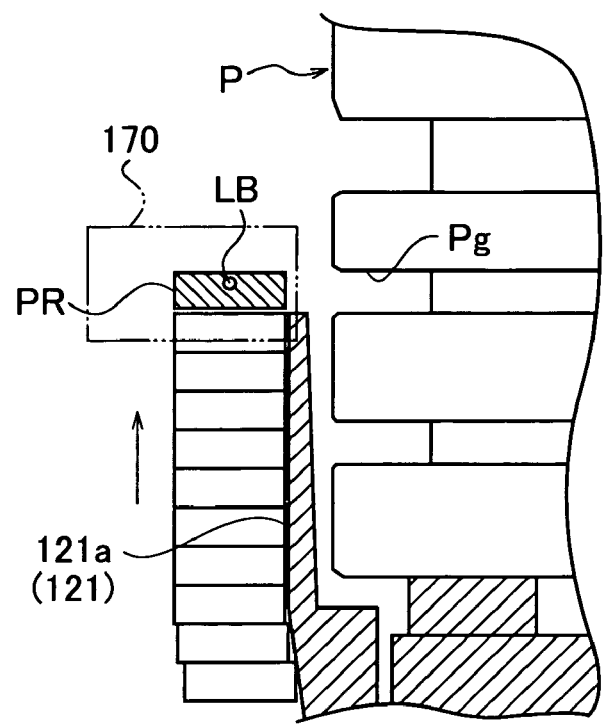
FIG. 10A and FIG. 10B are enlarged sectional views showing a relationship between a ring sensor serving as a part of the device according to the present invention and a piston ring.
Figure 10B:
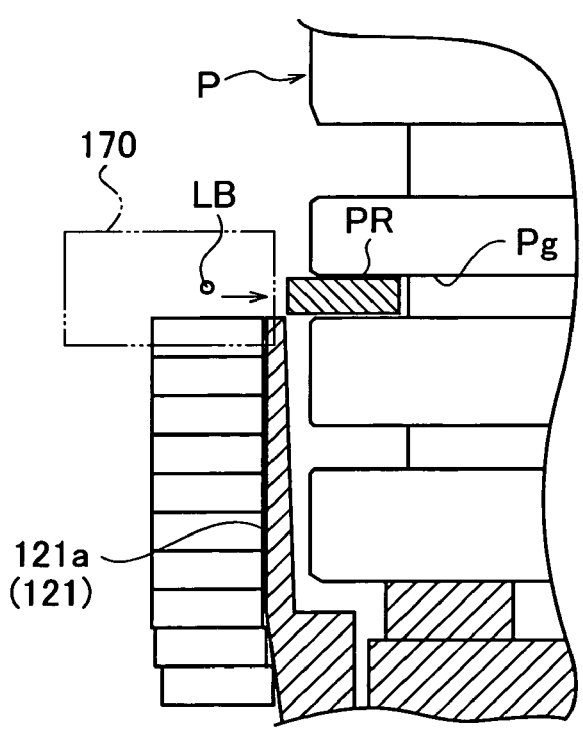

As shown in FIG. 4, the ring sensor 170 is a transmission type optical sensor that is fixed onto the base 110 and that includes a light emitter 171 and a light receiver 172. As shown in FIG. 10A and FIG. 10B, the ring sensor 170 detects a piston ring PR immediately before this piston ring PR is disengaged from the upper end of the guide member 120 (the upper guide part 121). In more detail, as shown in FIG. 10A, when the uppermost piston ring PR to be fed by the ring feeding mechanism 150 reaches a position occupied immediately before the piston ring PR is disengaged from the outer peripheral surface 121a of the guide member 120 (the upper guide part 121), light emitted from the light emitter 171 to the light receiver 172 is blocked, whereby the ring sensor 170 detects the piston ring PR, and sends a signal to stop the ring feeding mechanism 150. On the other hand, as shown in FIG. 10B, when the piston ring PR is disengaged from the outer peripheral surface 121a and enters the ring groove Pg of the piston P, light emitted from the light emitter 171 is received by the light receiver 172, whereby the ring sensor 170 indirectly detects that the installation of the piston ring PR has been completed.

Since the ring sensor 170 detects a piston ring PR immediately before being installed as described above, the ring feeding mechanism 150 can be reliably stopped at a desired timing, and the piston rings PR can be prevented from being fed in the form of double stacked piston rings or the like.

Next, a description will be given of the whole operation of the piston-ring-installing device.

First, when a piston P conveyed by the conveyor 12 reaches a position substantially right above the through-hole 111 of the base 110, the conveyor 12 is stopped.

Thereafter, the driving mechanism 140 is actuated to move the piston pressing member 130 downwardly so as to depress the piston P. In more detail, when the actuator 142 is actuated to move the vertically movable member 143 downwardly, the horizontally movable member 144 and the piston pressing member 130 are first moved obliquely downwardly by the cam action of the cam member 145, and reach a position substantially right above the piston P in such a way that the connecting rod R enters the notch part 132. The horizontally movable member 144 and the piston pressing member 130 are then moved downwardly in the vertical direction, and the inner wall surface 131 of the piston pressing member 130 is brought into contact with the edge Pe of the upper end of the piston P so as to depress the piston P.

At this time, the piston P is centered (aligned) by the inner wall surface 131, and the head Ps of the piston P enters the concave part 121b of the guide member 120 (the upper guide part 121) while the piston P is being positioned in the horizontal direction (so that the axial center of the piston P coincides with the axial center of the guide member 120). The head Ps of the piston P is then brought into contact with the three positioning blocks 121c so as to be positioned in the vertical direction, and the driving mechanism 140 is stopped (depressing step).

Thereafter, the ring feeding mechanism 150 is driven when one magazine 161 is connected to the lower end of the guide member 120 (the lower guide part 123), and the pair of push-up pieces 153 push up a piston ring PR occupying the lowest end of the magazine 161. When a piston ring PR occupying the uppermost part of the guide member 120 is pushed up to a position occupied immediately before the piston ring PR is disengaged from the outer peripheral surface 121a, the ring sensor 170 emits a detection signal, and the ring feeding mechanism 150 is stopped (ring feeding step).

At the same time, the uppermost piston ring PR is disengaged from the outer peripheral surface 121a by its elastic force, and enters the ring groove Pg of the piston P. Accordingly, the ring sensor 170 detects that the piston ring PR has been completely fitted around the piston P.

Thereafter, the driving mechanism 140 is driven in the opposite direction, so that the piston pressing member 130 is moved upwardly. The piston P is released from the depressing force, and is lifted to an upper position by means of the movable plate 14. Thereafter, the conveyor 12 is operated, and the piston P to which the piston rings PR have been attached is carried out, and, at the same time, a piston P to which piston rings PR have not yet been attached is carried in. Subsequently, the same sequence is repeated.

The operation of the ring feeding mechanism 150 will be further described. In a case in which all piston rings PR held by the magazine 161 are fed, and the pair of push-up pieces 153 push up piston rings PR held on the guide member 120, the magazine 161 having no piston ring PR is allowed to recede from the lower end of the guide member 120 when the lowest piston ring PR goes beyond the annular convex part 123b of the lower guide part 123. Another magazine 161 holding piston rings PR is then connected to the lower end of the guide member 120. Thereafter, the ring feeding mechanism 150 is retreated to the standby position, and the same feeding operation as above is again performed.

If the ring feeding mechanism 150 (the pair of push-up pieces 153) is retreated when the magazine 161 is replaced, the feeding action or the holding action thereof will not function, but, the lowest piston ring PR is held by the annular convex part 123b, and is held by the outer peripheral surfaces 123a, 121a, and 121a of the guide member 120 without being dropped off.

Therefore, when piston rings PR are supplied to the guide member 120 by use of a plurality of magazines 161 holding the piston rings PR, the retreat of the ring feeding mechanism 150 and the replacement of the magazine 161 can be easily performed at a desired timing.

In the above embodiment, the guide member 120 is made up of the upper guide part 121, the intermediate guide part 122, and the lower guide part 123. However, these components may be formed integrally with each other. Additionally, the intermediate guide part 122 is provided with a part fixed to the base 110. However, without being limited to this, the same area as the area 122b' may be formed on, for example, the lower guide part 123 so that the guide member 120 can be fixed to the base 110 in a greater range in the vertical direction.

In the above embodiment, the annular convex part 123b provided on the guide member 120 (the lower guide part 123) is formed continuously in the circumferential direction. However, without being limited to this, a plurality of convex parts divided in the circumferential direction are also included in the concept of the annular convex part.

In the above embodiment, the piston pressing member 130 is shaped like a cap. However, without being limited to this, another shape may be employed if the piston pressing member 130 is shaped so that a centering (aligning) operation can be performed.

As described above, according to the piston-ring-installing device and method of the present invention, a structure is employed that includes a piston pressing member that performs a centering action while being driven by a driving mechanism by which a cam action is exerted and a guide member that receives a head of a piston at its upper end so as to perform positioning in the vertical direction and that guides a piston ring while widening the diameter of the piston ring by means of an outer peripheral surface. Therefore, the piston and the piston ring can be highly accurately positioned in the horizontal and vertical directions with a simple structure and ease. Hence, productivity is improved, and production costs are reduced.

INDUSTRIAL APPLICABILITY

As described above, according to the piston-ring-installing device and method of the present invention, piston rings can be installed to a piston of an internal combustion engine at high speed, in an automatic manner, and with high accuracy. Hence, the device and method of the present invention are useful in, for example, an automatic assembly line of an internal combustion engine.

What is claimed is:

1. A device for installing a piston ring comprising:
   a base that has a through-hole passing through the base in a vertical direction;
   a guide member disposed in the through-hole and fixed to the base, the guide member having a concave part for receiving a head of a piston that is suspended and held downwardly in a vertical direction and swingably connected to a connecting rod, and guiding a piston ring while widening a diameter of the piston ring by means of an outer peripheral surface of the guide member;
   a piston pressing member disposed above the base and having a centering part that performs a centering action while coming into contact with an upper end edge of the piston suspended downwardly in the vertical direction;
   a driving mechanism, provided on the base, for driving the piston pressing member toward the concave part of the guide member while holding the piston pressing member; and
   a ring feeding mechanism that feeds the piston ring guided by the guide member upwardly,
   wherein the centering part of the piston pressing member is formed into the shape of a cylindrical cap that is opened downwardly and has a notch part defined by cutting off a part thereof so as not to come into contact with the connecting rod of the piston, and a tapered inner wall surface that is widened downwardly so as to come into contact with the upper end edge of the piston.

2. The device for installing a piston ring as set forth in claim 1, wherein the driving mechanism includes:
   a vertically movable member driven in the vertical direction;
   a horizontally movable member that holds the piston pressing member, and that is supported movably horizontally with respect to the vertically movable member; and
   a cam member that exerts a cam action onto a follower provided on the horizontally movable member.

3. The device for installing a piston ring as set forth in claim 1, wherein
   the guide member includes a lower guide part formed as an outer peripheral surface with the same diameter over a predetermined length, and the lower guide part has an annular convex part that is formed at a halfway position in an axial direction thereof and that restricts a downward movement of the piston ring.

4. The device for installing a piston ring as set forth in claim 1, wherein the concave part of the guide member is provided with at least three positioning blocks to come into contact with the head of the piston and to position the piston in the vertical direction.

5. The device for installing a piston ring as set forth in claim 1, wherein the base is provided thereon with a ring sensor that detects a piston ring immediately before the piston ring is disengaged from an upper end of the guide member.

* * * * *